No. 705,944. Patented July 29, 1902.
J. E. MITCHELL.
DUST COLLECTOR.
(Application filed Apr. 24, 1902.)
(No Model.)
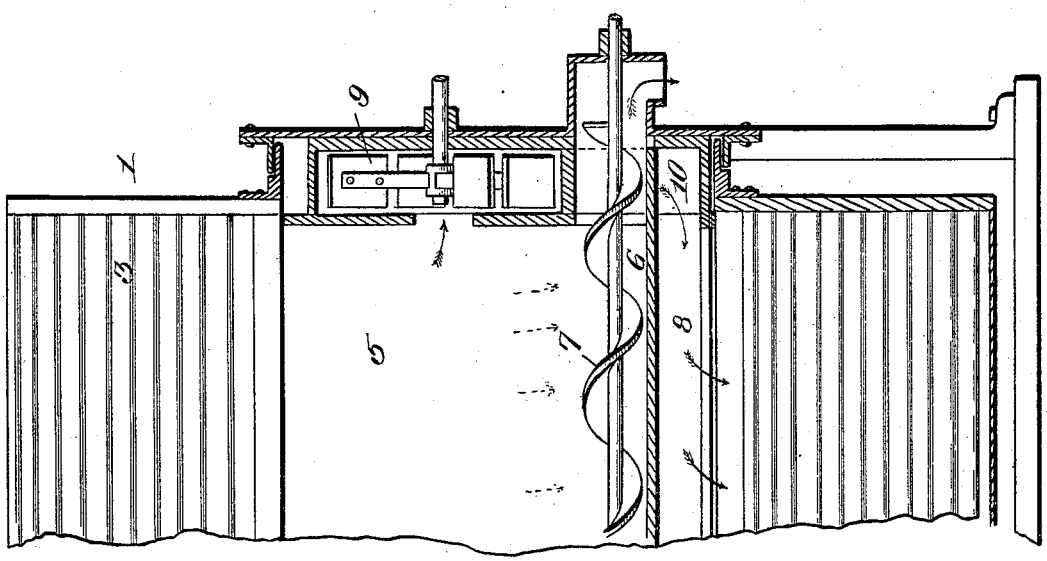
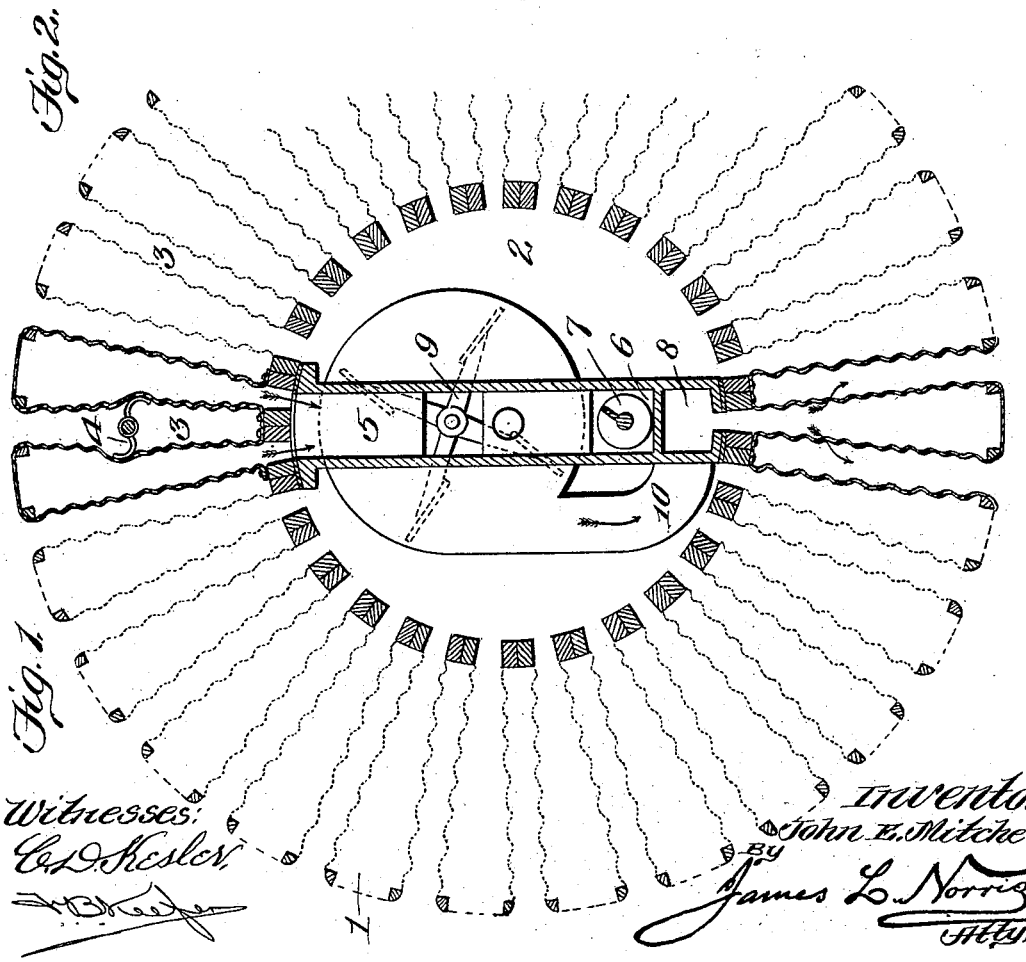
THE NORRIS PETERS CO., PHOTO-LITHO., WASHINGTON, D. C.

UNITED STATES PATENT OFFICE.

JOHN E. MITCHELL, OF ST. LOUIS, MISSOURI.

DUST-COLLECTOR.

SPECIFICATION forming part of Letters Patent No. 705,944, dated July 29, 1902.

Application filed April 24, 1902. Serial No. 104,552. (No model.)

*To all whom it may concern:*

Be it known that I, JOHN E. MITCHELL, a citizen of the United States, residing at St. Louis, in the State of Missouri, have invented new and useful Improvements in Dust-Collectors, of which the following is a specification.

In an application for patent filed by me February 27, 1902, Serial No. 95,975, I have shown and described certain improvements in dust-collectors in which is employed a rotary reel having a central drum therein into which dust-laden air is introduced, filtering pockets or frames carried by said reel and communicating at their inner ends with said drum, a cut-off chamber in said drum, cleaning mechanism operating upon the filtering-pockets, which are in communication with said cut-off chamber, and a reverse-draft fan independent of the fan which forces dust-laden air into said drum, the said reverse-draft fan having its inlet-opening communicating with said cut-off chamber without the interposition of separate pipes or tubes. The purpose of the reverse-draft fan referred to is to assist in removing the dislodged dust from the filtering-pockets, which are acted upon by the cleaning mechanism, the said fan exhausting into the atmosphere or back into the drum at the center of the reel.

My present invention is designed as an improvement for carrying forward of the invention set forth in the application referred to, the same consisting in the provision of means for filtering the air withdrawn from the cut-off chamber by said reverse-draft fan without the necessity of forcing the same back into the central drum in the reel.

The invention consists of two cut-off chambers in the drum into which dust-laden air is introduced and a back draft having its inlet-opening communicating with one of said cut-off chambers and its discharge-opening with the other.

The details of the invention will hereinafter appear, and the novel features thereof will be set forth in the claims.

In the accompanying drawings I illustrate the preferred embodiment of my invention, and in said drawings—

Figure 1 is a cross-section of a dust-collector embodying my improvements, and Fig. 2 is a partial longitudinal section of the same.

Like reference-numerals indicate like parts in the different views.

The rotatable reel 1, having the drum 2 at the center thereof, into which dust-laden air is introduced, the filtering medium, which in the example of my invention illustrated in the drawings is shown as pockets or frames 3, carried by said reel and communicating with said drum, and the cleaning mechanism 4 may be of any suitable form and construction. For example, these parts may be made in accordance with the construction disclosed in Letters Patent No. 683,314, granted to me September 24, 1901.

Located within the drum 2 is a cut-off chamber 5, whose outer end lies in close contact with the inner ends of the filtering-frames 3, by which the drum 2 is formed. The said cut-off chamber is adapted to exclude the dust-laden air in the drum 2 from those filtering frames or pockets 3 with which it is for the time being in communication and which are being acted upon by the cleaning mechanism 4. The said cut-off chamber 5 may be of any well-known and approved construction, the same discharging into a trough 6 at its lower end, in which is located a conveyer 7. Also located within the drum 2 and extending longitudinally of the reel is a secondary or supplemental cut-off chamber 8. The cut-off chamber 8 has been shown as located directly opposite the cut-off chamber 5, and this is the preferred location of the same; but it is obvious that the same may be otherwise disposed than in the position in which it is shown. The cut-off chamber 8 is designed to exclude the dust-laden air in the drum 2 from one or more of the filtering pockets or frames 3, for which purpose the outer end thereof lies in close contact with the inner ends of the filtering-frames 3, which form the drum 2. Coöperating with these parts is a back-draft fan 9, independent of the fan which forces dust-laden air into the drum 2, the said fan 9 being preferably disposed, as shown in my application above referred to, within the drum 2 and having its inlet communicating with the cut-off chamber 5, with which the cleaning mechanism 4 coöperates. Said fan may, however, be otherwise disposed, if desired. The exhaust-passage 10 of the casing in which the fan 9 is mounted communicates with the cut-off chamber 8, so that the fan 9 withdraws air from the cut-off chamber 5 and introduces air into the cut-off chamber 8. The primary function of the fan is to assist in removing the dust dislodged from the filtering frames or pockets 3 by the cleaning mechanism 4, so that the same will fall by gravity down into the trough 6, to be thence removed by the conveyer 7. Ordinarily but little, if any, dust will be withdrawn from the cut-off chamber 5 with the current of air created by the fan 9, especially when the cut-off chamber is constructed as shown in my application above referred to. However, such dust as may be withdrawn by this back draft or current of air will be refiltered by forcing it into the cut-off chamber 8, to be thence passed through the filtering frames or pockets 3, with which the latter cut-off chamber is in communication. It will thus be seen that instead of discharging the air withdrawn from the cut-off chamber 5 into the atmosphere or back into the drum 2 the same is passed into the supplemental cut-off or dead-air chamber 8, to be again filtered by the filtering frames or pockets 3. The said current is therefore unaffected in any way by the current or pressure inside the drum 2, which is produced by the main fan, which introduces the dust-laden air into said drum—that is to say, were the construction otherwise than that herein described the large outside fan, which introduces the dust-laden air into the drum 2, would interfere with and in some cases prevent the small fan 9 from discharging its air into the drum 2 by reason of the pressure created inside the drum by said large outside fan.

The filtering-surfaces of the filtering-frames 3 have been shown as corrugated; but no claim is made herein to this peculiarity of construction, as the same is covered by the claims of my copending application, Serial No. 85,258.

Having now described my invention, what I claim as new, and desire to secure by Letters Patent, is—

1. In a dust-collector, a reel having a central drum into which dust-laden air is introduced and having filtering frames or pockets communicating with said drum, a main cut-off chamber in said drum, cleaning mechanism for the filtering frames or pockets which are for the time being in communication therewith, a supplemental cut-off chamber in said drum, and a reverse-draft fan having its inlet communicating with the main cut-off chamber and its outlet communicating with the supplemental cut-off chamber.

2. In a dust-collector, a rotatable reel having a central drum into which dust-laden air is introduced and filtering frames or pockets thereon, a plurality of cut-off chambers in said drum designed to communicate with one or more of said filtering frames or pockets and to cut off the dust-laden air in said drum from said pockets, cleaning mechanism coöperating with the filtering frames or pockets which are for the time being in communication with one of said cut-off chambers, and a back-draft fan having its inlet communicating with the cut-off chamber with which said cleaning mechanism coöperates and having its outlet communicating with the other of said cut-off chambers.

3. In a dust-collector, a reel having a central drum into which dust-laden air is introduced and having filtering mechanism communicating with said drum, a main cut-off chamber in said drum, cleaning mechanism for that part of the filtering mechanism which is for the time being in communication therewith, a supplemental cut-off chamber in said drum, and a reverse-draft fan having its inlet communicating with the main cut-off chamber and its outlet communicating with the supplemental cut-off chamber.

In testimony whereof I have hereunto set my hand in presence of two subscribing witnesses.

JOHN E. MITCHELL.

Witnesses:
A. P. WEINGARTNER,
DENNIS PARKS.